(12) United States Patent  (10) Patent No.: US 6,742,209 B2
Jeon  (45) Date of Patent: Jun. 1, 2004

(54) SYSTEM FOR PROVIDING WASHING MACHINE OPERATION INFORMATION AND METHOD FOR THE SAME

(75) Inventor: Duck Goo Jeon, Seoul-si (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 09/866,686

(22) Filed: May 30, 2001

(65) Prior Publication Data

US 2002/0046429 A1 Apr. 25, 2002

(30) Foreign Application Priority Data

Oct. 19, 2000 (KR) ........................................ 2000-61660

(51) Int. Cl.$^7$ ................................................ D06F 33/02
(52) U.S. Cl. .......................................... 8/159; 68/12.01
(58) Field of Search .............................. 68/12.01, 12.02, 68/12.12, 12.16, 12.27; 8/158, 159

(56) References Cited

U.S. PATENT DOCUMENTS

| | | | |
|---|---|---|---|
| 4,977,394 A | * | 12/1990 | Manson et al. |
| 5,235,827 A | * | 8/1993 | Kiuchi et al. |
| 5,400,246 A | * | 3/1995 | Wilson et al. |
| 5,506,892 A | * | 4/1996 | Kojima et al. |
| 5,647,231 A | * | 7/1997 | Payne et al. |
| 5,757,643 A | * | 5/1998 | Kuroda et al. |
| 5,839,097 A | * | 11/1998 | Klausner |
| 6,167,358 A | * | 12/2000 | Othmer et al. |

FOREIGN PATENT DOCUMENTS

| | | | |
|---|---|---|---|
| JP | 5-57100 | * | 3/1993 |
| JP | 6-205900 | * | 7/1994 |
| JP | 11-146991 | * | 6/1996 |
| JP | 9-298773 | * | 11/1997 |

* cited by examiner

*Primary Examiner*—Frankie L. Stinson
(74) *Attorney, Agent, or Firm*—Birch, Stewart, Kolasch & Birch, LLP

(57) ABSTRACT

A method and system for providing washing machine operation information. The system comprises an input unit for inputting a command for washing machine operation control from a user, a controller for generating an operation control signal in response to the command inputted by the input unit to control the operation of a washing machine, and processing data regarding a use history and abnormal state of the washing machine, an operation drive circuit for driving a washing tub in the washing machine and supply/discharge of wash water in response to the operation control signal from the controller, a communication unit for supporting a communication function to transmit and receive the data processed by the controller externally over a communication network, a service provider connected to the communication unit for collecting the data from the controller, comparison-analyzing the collected data and generating control information for the setup of an optimum washing environment of the machine as a result of the analysis, and an output unit for externally displaying the control information from the service provider and its result processed by the controller. A using pattern of the user or an abnormal state of the washing machine is sensed and managed online, thereby improving the reliability and performance of the machine.

7 Claims, 2 Drawing Sheets

SYSTEM FOR PROVIDING WASHING MACHINE OPERATION INFORMATION AND METHOD FOR THE SAME

BACKGROUND OF THE INVENTION

1. Field of the Invention

The present invention relates in general to a method and system for providing washing machine operation information, and more particularly to a method and system for providing washing machine operation information, wherein a communication function is performed to externally transit data about use history and an abnormal state of a washing machine, receive external information regarding the setup of an optimum washing environment of the washing machine, generated on the basis of the transmitted data, and notify a user of the received information.

2. Description of the Prior Art

Recently, washing machines have become essential electric appliances in homes. In particular, the need for washing machines is a significantly increasing trend as women conducting both occupational work and domestic work are increasing in number.

It is a common feature of washing machines that they comprise a washing tub for holding laundry to be washed, a motor for driving the washing tub, a controller for controlling the motor, and an input unit for inputting a control value from a user to control the controller in response to a request from the user.

It is natural that washing machines consume considerable amounts of wash water and electric power because they must be able to wash a large amount of laundry at one time.

Provided that a washing machine user uses a washing machine in an existing incorrect pattern without recognizing a correct washing method, necessary wash water and electric power consumptions will reach considerable amounts. However, it is a current reality that it is impossible to advise such a washing machine user of the proper usage pattern.

Further, upon occurrence of an error in a washing machine, a washing machine user will contact an A/S center or other facility to personally call a service repairman to repair the error, resulting in an inconvenience.

Furthermore, the service repairman must personally move himself to a place where the washing machine is present, in order to repair the machine, resulting in time and increased costs.

SUMMARY OF THE INVENTION

Therefore, the present invention has been made in view of the above problems, and it is an object of the present invention to provide a method and system for providing washing machine operation information, which is capable of online sensing and managing a using pattern of a user and an abnormal state of a washing machine for the user's convenience, thereby improving the reliability and performance of the machine.

In accordance with one aspect of the present invention, the above and other objects can be accomplished by the provision of a method for providing washing machine operation information, comprising the steps of a) additionally providing a communication function in a washing machine to enable external data transmission and reception; b) constructing a service provider for collecting and analyzing data regarding the washing machine and generating control information as a result of the analysis; c) allowing the service provider to collect the data regarding the washing machine from the machine; d) allowing the service provider to generate the control information on the basis of the collected data and transmit the generated control information to the washing machine; and e) outputting the control information transmitted from the service provider externally.

In accordance with another aspect of the present invention, there is provided a system for providing washing machine operation information, comprising an input unit for inputting a command for washing machine operation control from a user; a controller for generating an operation control signal in response to the command inputted by the input unit to control the operation of a washing machine, and processing data regarding use history and abnormal state of the washing machine; and operation drive circuit for driving a washing tub in the washing machine and supply/discharge of wash water in response to the operation control signal from the controller; a communication unit for supporting a communication function to transmit and receive the data processed by the controller externally over a communication network; a service provider at a location external to the washing machine and connected to the communication unit for collecting the data from the controller, comparison-analyzing the collected data and generating control information for the setup of an optimum washing environment of the machine as a result of the analysis; and an output unit for externally displaying the control information from the service provider and its result processed by the controller.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
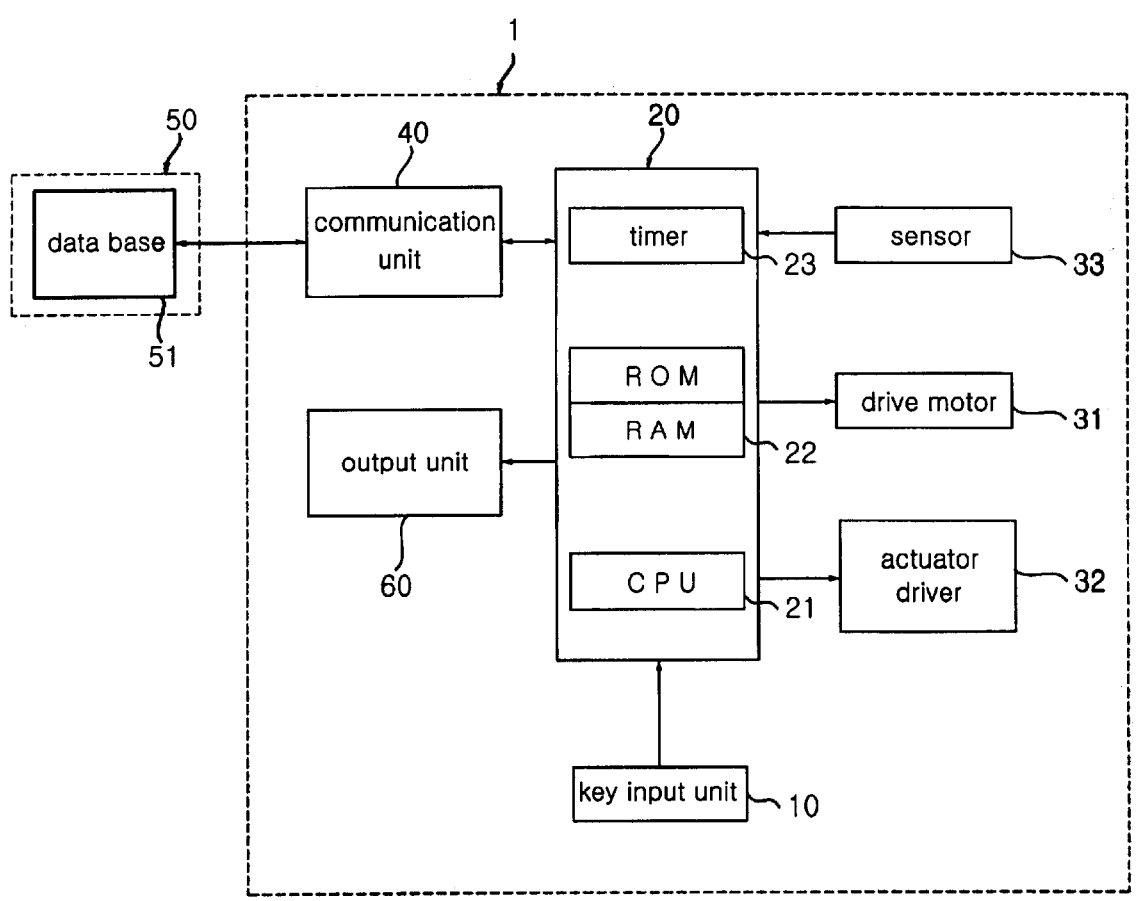
FIG. 1 is a block diagram showing the internal construction of a system for providing washing machine operation information in accordance with the present invention.

With reference to FIG. 1, there is shown in block form the internal construction of a system for providing washing machine operation information in accordance with the present invention. As shown in this drawing, the system comprises a key input unit 10 for inputting a command from a user in response to a user's key operation, a controller 20 for processing the command inputted by key input unit 10 and generating an operation control signal in accordance with the processed result to control the operation of a washing machine 1, an operation drive circuit 30 for driving a washing tub in the washing machine 1 in response to the operation control signal from the controller 20, a communication unit 40 for connecting the washing machine 1 externally in response to a request from the user, a service provider 50 for transmitting control information about use history of the user or an abnormal state of the washing machine 1 connected to the machine 1 through the communication unit 40, and an output unit 60 for externally displaying the control information from the service provider 50 and its result processed by the controller 20.

The key input unit 10 may preferably include a touch screen operable by a touch from the user.

The controller 20 includes a central processing unit (CPU) 21 for processing the command inputted by the key input unit 10 and generating the operation control signal in accordance with the processed result to control the operation of each component in the washing machine 1. The CPU 21 is further adapted to communicate with the service provider 50 through the communication unit 40, receive the control information from the service provider 50 through the communication unit 40 and process the received control information. The controller 20 further includes a memory unit 22 for temporarily storing control information from the CPU 21, data regarding the use history of the user and data related to the abnormal state of the washing machine 1. The memory unit 22 may preferably include a read only memory (ROM) and random access memory (RAM). The controller 20 further includes a timer 23 for measuring a time period for which each component in the washing machine 1 operates in response to the operation control signal from the CPU 21.

The operation drive circuit 30 includes a drive motor 31 for driving the washing tub in response to the operation control signal from the controller 20, an actuator driver 32 for driving supply/discharge of wash water in response to the operation control signal from the controller 20, and a sensor 33 for sensing the operation of the drive motor 31 and actuator driver 32, generating data about the amounts of electric power and wash water consumptions as a result of the sensing and outputting the generated data to the control 20.

The service provider 50 includes a database 51 for receiving and storing data from the controller 20. The service provider 50 is adapted to periodically transmit control information about a using pattern of the user and comparison-analyzed data about an abnormal state of the washing machine to the machine.

In other words, according to this invention, a communication function is additionally provided in the washing machine to enable connections with communication networks including the Internet. A service provider monitors a history about the use of the washing machine by the user for a predetermined period of time, stores the monitored result in a database, analyzes and arranges the stored information and feeds the analyzed and arranged result back to the user. Therefore, the service provider provides the user with a correct procedure concerning the amounts of wash water and electric power to be used and the number of washing times. Further, the service provider monitors any abnormal state of the washing machine at all times and manages the machine in an appropriate manner according to the monitored result.

Figure 2:
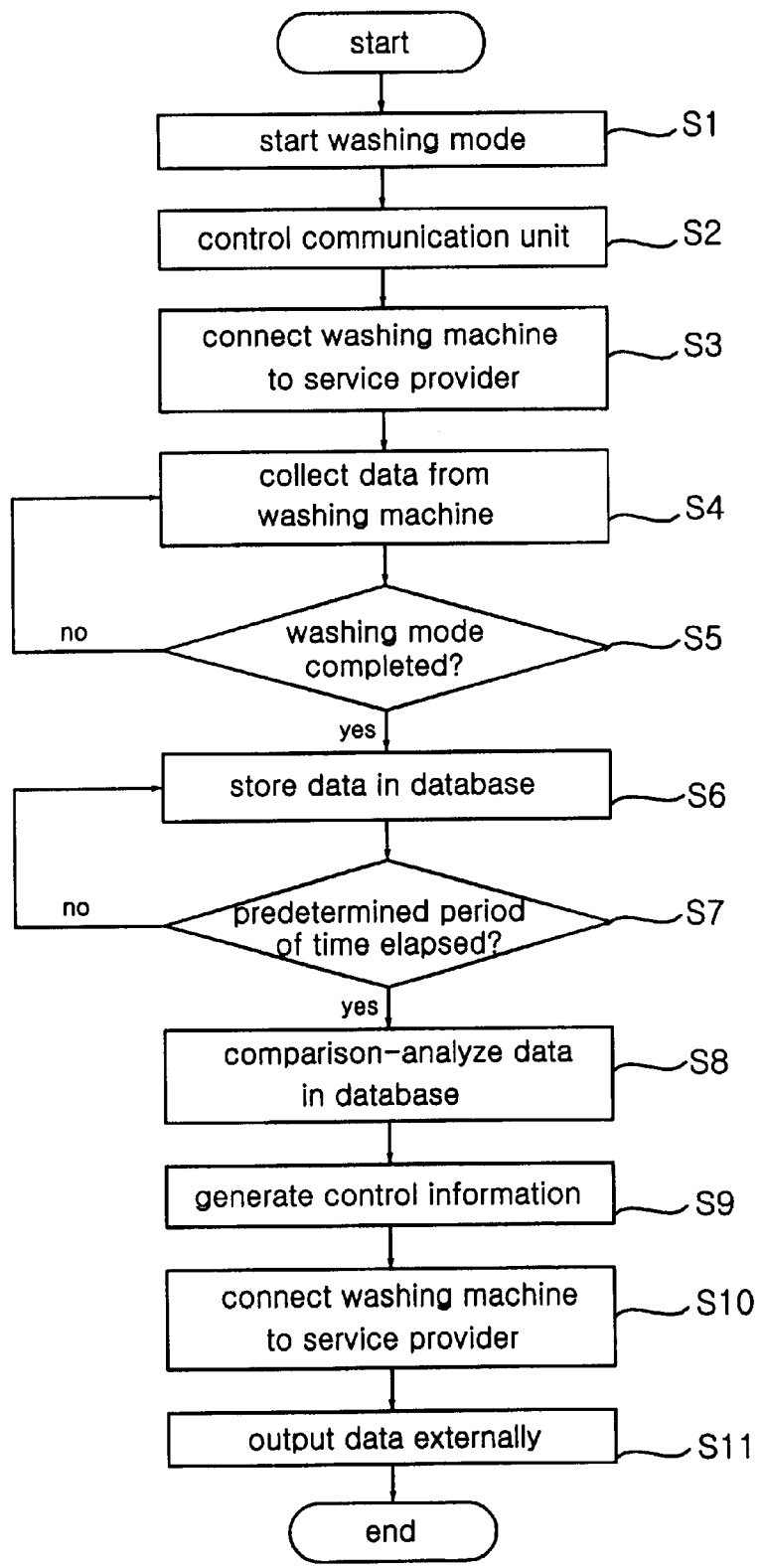
FIG. 2 is a flowchart illustrating a method for providing washing machine operation information in accordance with the present invention.

FIG. 2 is a flowchart illustrating a method for providing washing machine operation information in accordance with the present invention.

At the first step S1, the user starts a washing mode of the washing machine 1 capable of communicating with the service provider 50 constructed as stated above, by operating the key input unit 10 installed in the machine 1. As the washing mode of the washing machine 1 is started, the CPU 21 in the controller 20 senses such a situation and then controls the communication unit 40 at the second step S2 to connect the washing machine 1 to the service provider 50 at the third step S3.

At the fourth step S4, the service provider 50 collects data about the amounts of wash water and electric power being used and the number of washing times from the washing machine 1 online over the Internet.

At the fifth step S5, if the data collection by the service provider 50 is ended with the completion of the washing mode, then the connection between the service provider 50 and the washing machine 1 via the communication unit is released.

At the sixth step S6, the service provider 50 arranges the collected data and stores the arranged data in the database 51.

At the seventh and eighth steps S7 and S8, the service provider 50 periodically comparison-analyzes the data stored in the database 51 whenever a predetermined period of time elapses. The time period may preferably be preset on a weekly or monthly basis.

At the ninth step S9, the service provider 50 generates control information regarding an optimum washing environment of the washing machine 1 on the basis of the comparison-analyzed data. The control information may preferably contain information for pointing out an incorrect using pattern of the user and management information about an abnormal state of the washing machine.

At the tenth step S10, the service provider 50 transmits the above control information to the washing machine 1 when it is connected again to the machine 1. Then, the transmitted control information is delivered to the CPU 21 in the controller 20. The CPU 21 analyzes or appropriately processes the delivered control information and outputs the analyzed or processed result to the output unit 60. At the eleventh step S11, the output unit 60 displays the output information from the CPU 21 on the screen so that it can be recognized by the user. Alternatively, the output unit 60 may transfer the output information from the CPU 21 externally using an audio signal, etc.

As apparent from the above description, the present invention provides a method and system for providing washing machine operation information, which can provide a washing machine user with a correct usage against an incorrect using pattern and set up an optimum washing environment of the washing machine, thereby curtailing expenses resulting from the incorrect using pattern. Further, an abnormal state of the washing machine is monitored and managed, thereby improving the reliability and performance of the machine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing washing machine operation information, comprising the steps of:
   a) additionally providing a communication function in a washing machine to enable external data transmission and reception;
   b) constructing a service provider for collecting and storing usage and operation history data of the washing machine, analyzing blocks of data covering pre-set periods of time and generating control information to control the operation of the washing machine, based on said analyzing;
   c) allowing said service provider to collect said data regarding said washing machine from said machine;
   d) allowing said service provider to generate said control information on the basis of the collected data and transmit the generated control information to said washing machine; and
   e) outputting said control information transmitted from said service provider for external display to a user of said washing machine, enabling said user to modify a usage pattern and set up an optimum washing environment.

2. The method as set forth in claim 1, wherein said step b) includes the step of constructing said service provider in an online manner to allow said service provider to transmit and receive data to/from said washing machine over the Internet.

3. The method as set forth in claim 1, wherein said step c) includes the steps of:

c-1) connecting said washing machine to said service provider via said communication function; and c-2) allowing said service provider to collect data about a use history and abnormal state of said washing machine from said machine.

4. The method as set forth in claim 3, wherein said step c-1) includes the step of connecting said washing machine to said service provider when a washing mode of said machine is started.

5. The method as set forth in claim 3, wherein said step c-2) includes the step of allowing said service provider to end the data collection from said washing machine when said washing mode of said machine is completed.

6. The method as set forth in claim 1, wherein said step d) includes the steps of:

d-1) allowing said service provider to arrange and store said data collected at said step c) in a database;

d-2) allowing said service provider to comparison-analyze said data stored in said database;

d-3) allowing said service provider to generate said control information in accordance with the analyzed result; and d-4) allowing said service provider to transmit said generated control information to said washing machine.

7. The method as set forth in claim 6, wherein said step d-2) includes the step of allowing said service provider to periodically comparison-analyze said data stored in said database whenever a predetermined period of time elapses.

* * * * *